US010819393B2

(12) United States Patent
Nakano et al.

(10) Patent No.: US 10,819,393 B2
(45) Date of Patent: Oct. 27, 2020

(54) ELECTROMAGNETICALLY-COUPLED STATE DETECTION CIRCUIT, POWER TRANSMISSION APPARATUS, CONTACTLESS POWER TRANSMISSION SYSTEM, AND ELECTROMAGNETICALLY-COUPLED STATE DETECTION METHOD

(71) Applicant: Sony Corporation, Tokyo (JP)

(72) Inventors: Hiroaki Nakano, Tokyo (JP);
Tomomichi Murakami, Tokyo (JP);
Shinichi Fukuda, Kanagawa (JP);
Osamu Kozakai, Kanagawa (JP);
Kenichi Fujimaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 324 days.

(21) Appl. No.: 15/716,793

(22) Filed: Sep. 27, 2017

(65) Prior Publication Data
US 2018/0034509 A1     Feb. 1, 2018

Related U.S. Application Data

(63) Continuation of application No. 14/116,004, filed as application No. PCT/JP2012/059784 on Apr. 10, 2012, now Pat. No. 9,806,769.

(30) Foreign Application Priority Data

May 18, 2011   (JP) .................... 2011-111432

(51) Int. Cl.
*H02J 5/00*     (2016.01)
*H04B 5/00*    (2006.01)
(Continued)

(52) U.S. Cl.
CPC .......... *H04B 5/0037* (2013.01); *B60L 53/124* (2019.02); *H02J 50/12* (2016.02); *H02J 50/60* (2016.02); *H02J 50/80* (2016.02)

(58) Field of Classification Search
CPC ...... H04B 5/0037; B60L 53/124; H02J 50/12; H02J 50/60; H02J 50/80; H02J 5/005; G01V 3/10
See application file for complete search history.

(56) References Cited

U.S. PATENT DOCUMENTS

2006/0033455 A1\*  2/2006  Chen ................ H05B 41/2825
                                                                  315/300
2008/0197802 A1     8/2008  Kota et al.
(Continued)

FOREIGN PATENT DOCUMENTS

CN         101442221 A      5/2009
CN           10200527          4/2011
(Continued)

OTHER PUBLICATIONS

European Search Report dated Jun. 26, 2015 corresponding to European Serial No. 1286268.8.
(Continued)

*Primary Examiner* — Rexford N Barnie
*Assistant Examiner* — Terrence R Willoughby
(74) *Attorney, Agent, or Firm* — Dentons US LLP

(57) ABSTRACT

An electromagnetically-coupled state detection circuit including a detection unit that measures a primary side Q value of a circuit containing a primary side coil electromagnetically coupled with a secondary side coil and power transmission efficiency to the secondary side coil, corrects the power transmission efficiency based on the Q value of the primary side coil, and detects a state of electromagnetic (Continued)

coupling with the secondary side coil based on an obtained corrected value of the power transmission efficiency.

17 Claims, 10 Drawing Sheets

(51) Int. Cl.
    *H02J 50/80* (2016.01)
    *H02J 50/60* (2016.01)
    *H02J 50/12* (2016.01)
    *B60L 53/124* (2019.01)

(56) References Cited

U.S. PATENT DOCUMENTS

| 2008/0211320 | A1 | 9/2008 | Cook et al. | |
|---|---|---|---|---|
| 2009/0001932 | A1 | 1/2009 | Takahiro et al. | |
| 2010/0070219 | A1* | 3/2010 | Azancot | H02J 5/005 |
| | | | | 702/62 |
| 2011/0074346 | A1* | 3/2011 | Hall | B60L 3/00 |
| | | | | 320/108 |

FOREIGN PATENT DOCUMENTS

| CN | 102005827 A | 4/2011 |
|---|---|---|
| EP | 2290782 | 3/2011 |
| JP | 2001-275280 | 10/2001 |
| JP | 2008-206231 | 9/2008 |
| JP | 2011-050140 | 3/2011 |
| WO | WO/2008/118178 A1 | 10/2008 |
| WO | WO/2009/140506 A1 | 11/2009 |
| WO | WO/2011/010375 A1 | 1/2011 |

OTHER PUBLICATIONS

Chinese Office Action dated Jul. 3, 2015 issued in corresponding Chinese Patent Application No. 2012800228286.
PCT Search Report dated Jun. 28, 2012 corresponding to PCT/JP2012/059784.
Koizumi, et al., "The demonstration of wireless power transmission using the strongly coupled resonance in three dimensions", Proceedings of the 2010 IEICE General Conference, Tsushin 1, Mar. 2, 2010 ISSN 1349-1369.
Chinese Office Examination Report issued in connection with related Chinese Application No. 201610930919X dated Jul. 3, 2018 with English translation.
Koizumi, et al., "The demonstration of wireless power transmission using the strongly coupled resonance in three dimensions", Proceedings of the 2010 IEICE General Conference, Tsushin 1, Mar. 2, 2010 ISSN 1349-1369 with English translation.

* cited by examiner

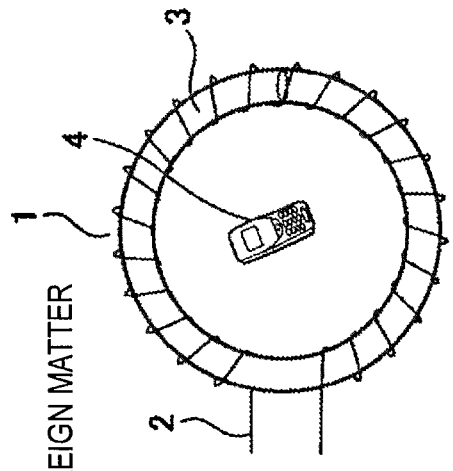
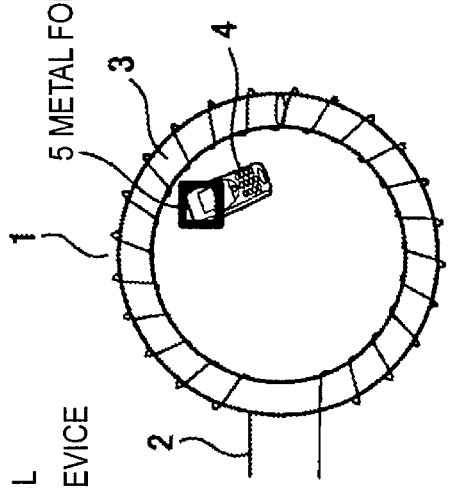
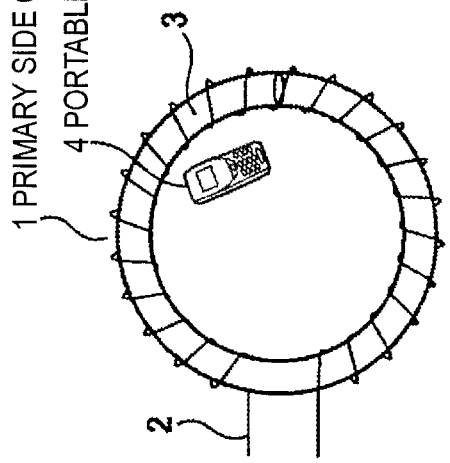

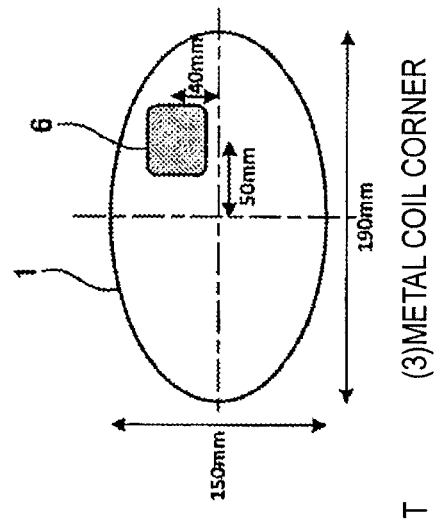
FIG. 2(C) (3) METAL COIL CORNER
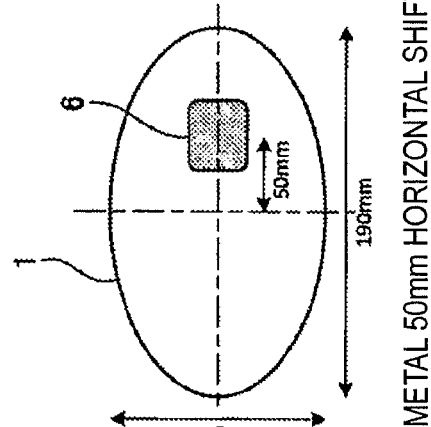
FIG. 2(B) (2) METAL 50mm HORIZONTAL SHIFT
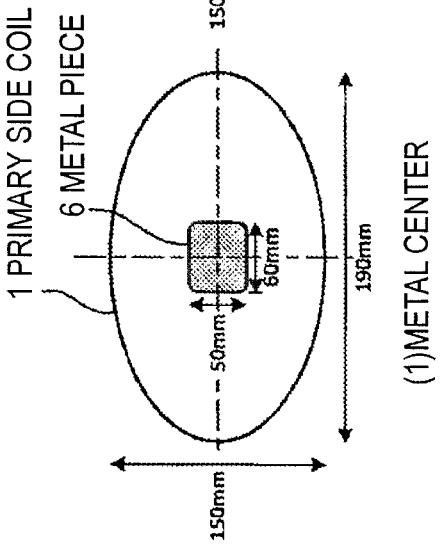
FIG. 2(A) (1) METAL CENTER
1 PRIMARY SIDE COIL
6 METAL PIECE

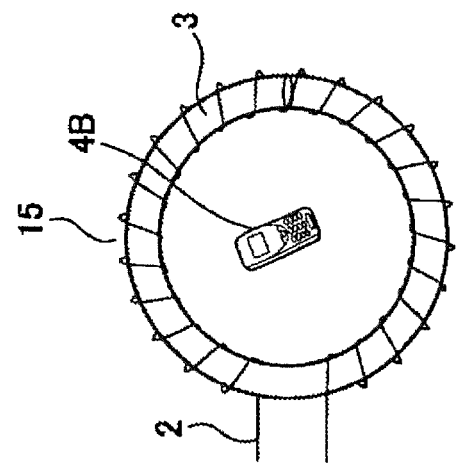
FIG. 7(A) (1) PORTABLE DEVICE CENTER (ALUMINUM)
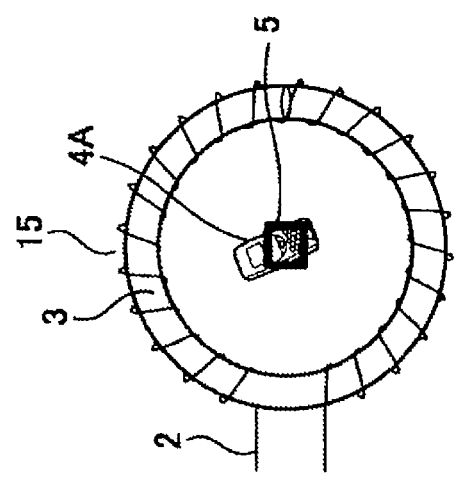
FIG. 7(B) (2) PORTABLE DEVICE CENTER (ALUMINUM) + METAL FOREIGN MATTER
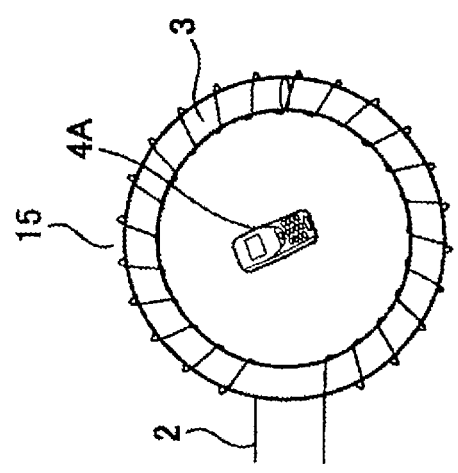
FIG. 7(C) (3) PORTABLE DEVICE CENTER (STAINLESS)

ELECTROMAGNETICALLY-COUPLED STATE DETECTION CIRCUIT, POWER TRANSMISSION APPARATUS, CONTACTLESS POWER TRANSMISSION SYSTEM, AND ELECTROMAGNETICALLY-COUPLED STATE DETECTION METHOD

RELATED APPLICATION DATA

This application is a continuation of U.S. patent application Ser. No. 14/116,004 filed Nov. 6, 2013, the entirety of which is incorporated herein by reference to the extent permitted by law. U.S. patent application Ser. No. 14/116,004 is the Section 371 National Stage of PCT/JP2012/059784 filed Apr. 10, 2012. The present application claims the benefit of priority to Japanese Patent Application No. JP 2011-111432 filed on May 18, 2011 in the Japan Patent Office, the entirety of which is incorporated by reference herein to the extent permitted by law.

TECHNICAL FIELD

The present disclosure relates to an electromagnetically-coupled state detection circuit, a power transmission apparatus, a contactless power transmission system, and an electromagnetically-coupled state detection method.

BACKGROUND ART

In recent years, contactless power transmission systems that supply power wirelessly, that is, in a non-contact manner have been actively developed. A method that attracts attention to realize contactless power transmission is the magnetic resonance method. The magnetic resonance method uses electromagnetic coupling between a transmitting coil and receiving coil for power transmission. By actively using a resonance phenomenon, the magnetic resonance method is characterized in that the amount of magnetic fluxes shared between a power supply source and a power supply destination may be small.

According to the widely known electromagnetic induction method, the degree of coupling between a transmitting side and a receiving side is very high and power can be supplied with high efficiency. However, because it is necessary to maintain the coupling coefficient at a high level, power transmission efficiency between coils on the transmitting side and the receiving side (hereinafter, called an "inter-coil efficiency") is greatly degraded if the transmitting side and the receiving side are widely apart or displaced. On the other hand, the magnetic resonance method is characterized in that the inter-coil efficiency is not degraded when a Q value is large even if the coupling coefficient is small. That is, the need to adjust the axes of the transmitting side coil and the receiving side coil is advantageously eliminated and also a high degree of flexibility in positions of the transmitting side and the receiving side and the distance therebetween is provided. The Q value is an index of a circuit having the transmitting side or receiving side coil to represent the relationship between conservation and losses of energy (indicating the strength of resonance of a resonance circuit). The inter-coil efficiency will be described again later.

One of the most important elements in a contactless power transmission system is measures against heat of metal foreign matter. When power is supplied in a non-contact manner regardless of the electromagnetic induction method or the magnetic resonance method, an eddy current is generated if a metal is present between the transmitting side and the receiving side and the metal may be heated. To reduce the heat generation, many techniques to detect metal foreign matter have been proposed. For example, a technique using an optical sensor or a temperature sensor is known. However, a detection method using a sensor will be expensive when the range of power supply is wide like when the magnetic resonance method is used. In addition, when a temperature sensor is used, an output result of the temperature sensor depends on thermal conductivity therearound, which imposes design restrictions on devices on the transmitting side and the receiving side.

Thus, a technique to judge whether metal foreign matter is present by checking changes of parameters (the current, voltage and the like) when metal foreign matter comes between the transmitting side and the receiving side is proposed. Such a technique can reduce the cost without the need to impose design restrictions or the like. For example, Patent Literature 1 proposes a method of detecting metal foreign matter based on the degree of modulation during communication between the transmitting side and the receiving side and Patent Literature 2 proposes a method of detecting metal foreign matter based on eddy-current losses (foreign matter detection by DC-DC efficiency).

CITATION LIST

Patent Literature

Patent Literature 1: JP 2008-206231A
Patent Literature 2: JP 2001-275280A

SUMMARY OF INVENTION

Technical Problem

However, according to the techniques proposed in Patent Literatures 1, 2, the influence of a metal cabinet on the receiving side is not taken into consideration. When charging of a common portable device (mobile device) is considered, it is highly probable that some metal (such as a metal cabinet, metal component or the like) is used in the portable device and it is difficult to tell whether parameter changes are caused by "influence of the metal cabinet or the like" or "mingling of metal foreign matter". To take Patent Literature 2 as an example, whether eddy-current losses are caused by the metal cabinet of the portable device or mingling of metal foreign matter between the transmitting side and the receiving side is unknown.

Moreover, when the power supply range with a high degree of freedom of arrangement like the magnetic resonance method is considered, the influence of the metal cabinet of a device on the receiving side changes depending on how the device (portable device such as a portable phone) on the receiving side is arranged with respect to the power supply range. Thus, the relationship between the position of a portable device with respect to the transmitting side coil (primary side coil) and the influence of metal foreign matter will be described with reference to FIGS. 1(a) to 1(c).

FIG. 1(a) shows an example in which a portable device 4 is arranged at an end (position close to a core 3) of an annular primary side coil 1 (spiral coil) configured by winding, for example, a thin conductor 2 around the annular core 3. In this case, a relatively large value is obtained as the inter-coil efficiency between the primary side coil 1 and a secondary side coil contained in the portable device 4. FIG.

1(b) shows an example in which the portable device 4 is arranged at an end of the primary side coil 1 and metal foreign matter 5 is present between the transmitting side and the receiving side. In this case, the value of the inter-coil efficiency is at a medium level. Further, FIG. 1(c) shows an example in which the portable device 4 is arranged in the center of the primary side coil 1 and in this case, the value of the inter-coil efficiency is at a medium level.

In the examples of FIGS. 1(a) to 1(c), an example of a coil having a structure in which a thin conductor is wound around the core 3 having a magnetic body as the primary side coil 1, but similar measurement results are also obtained from a coil having a structure without the core.

Thus, when a portable device is arranged in a certain position with respect to the primary side coil, a difference between values of inter-coil efficiency arises depending on whether or not metal foreign matter is present like the cases of FIGS. 1(a) and 1(b) and the difference can be used to detect metal foreign matter. However, the influence of the metal cabinet of the portable device is increased by, for example, the position of the portable device being brought closer to the center of the annular primary side coil and when compared with the case in which the portable device is at an end of the primary side coil, the inter-coil efficiency may be degraded. If the extent of influence of the metal cabinet exceeds the extent of influence of metal foreign matter, it becomes impossible for the contactless power transmission system to detect metal foreign matter. Because metal foreign matter mingled between the transmitting side and the receiving side is generally assumed to be smaller than the metal cabinet on the receiving side, when a contactless power transmission system is constructed by taking the influence of the metal cabinet into consideration and also maintaining the degree of freedom of arrangement, the precision of detecting metal foreign matter becomes a problem.

The present disclosure is developed in consideration of the above circumstances and the precision of detecting metal foreign matter present between the transmitting side and the receiving side in a contactless power transmission system is improved by reducing the influence of a metal cabinet on the receiving side (secondary side).

Solution to Problem

An aspect of the present disclosure adopts a configuration in which a primary side Q value of a circuit containing a primary side coil electromagnetically coupled with a secondary side coil and power transmission efficiency to the secondary side coil are measured, the power transmission efficiency is corrected based on the Q value of the primary side coil, and a state of electromagnetic coupling with the secondary side coil is detected based on an obtained corrected value of the power transmission efficiency.

According to an aspect of the present disclosure, even if a metal cabinet is present on the secondary side, the influence thereof is corrected.

Advantageous Effects of Invention

According to the present disclosure, the influence of a metal cabinet or the like on the receiving side (secondary side) is corrected so that the precision of detecting metal foreign matter can be improved. In addition, the influence of variations of the position of a secondary side coil in a plane of a primary side coil can be reduced.

BRIEF DESCRIPTION OF DRAWINGS

FIGS. 1(a) to 1(c) are diagrams illustrating the relationship between the position of a portable device with respect to a primary side coil and the influence of metal foreign matter.

FIGS. 2(a) to 2(c) are diagrams illustrating measurement conditions when a Q value of a primary side is measured by changing the position of metal.

FIGS. 7(a) to 7(c) are diagrams illustrating measurement conditions when each parameter is measured by changing the type of a metal cabinet of the portable device.

DESCRIPTION OF EMBODIMENTS

Figure 3:
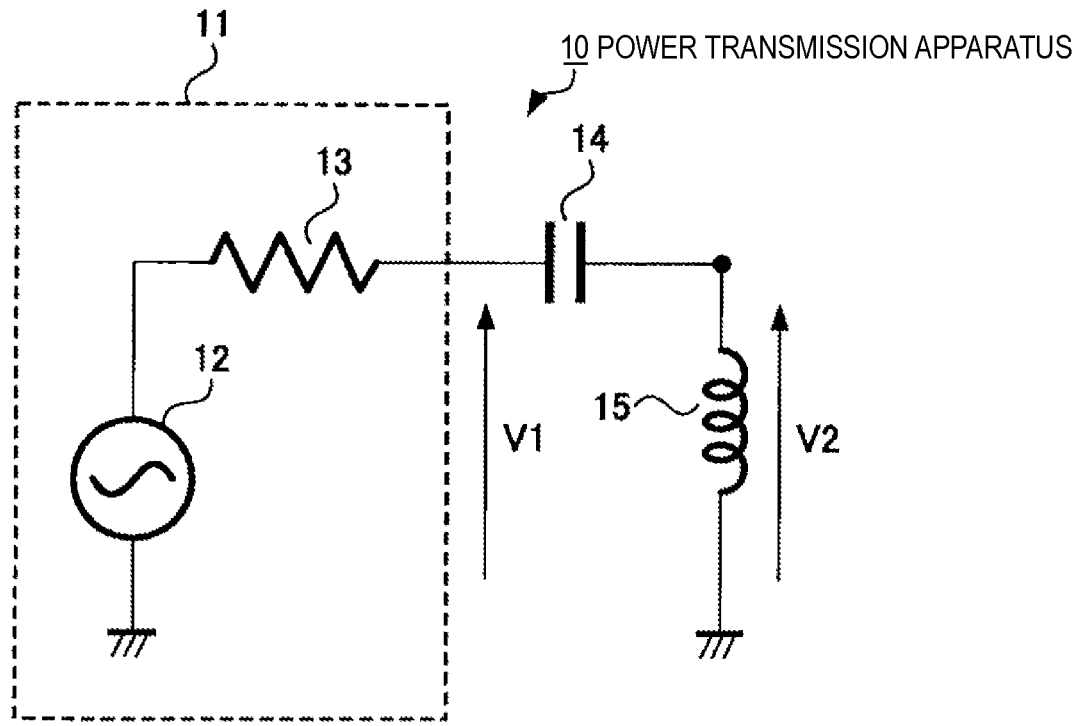
FIG. 3 is an explanatory view showing an outline of a power transmission apparatus used in a contactless power transmission system according to a first embodiment of the present disclosure.

Embodiments to carry out the present disclosure will be described below with reference to the appended drawings. The description will be provided in the following order. The same reference signs are attached to elements common to each figure to omit a duplicate description.

1. First Embodiment (detection unit: example of detecting metal foreign matter from the Q value on the primary side and the inter-coil efficiency)
2. Second Embodiment (Q value operation unit: example of calculating the Q value by the half-power band width method)
3. Third Embodiment (Q value operation unit: example of calculating the Q value from the ratio of the real part to the imaginary part of impedance)
4. Others (various modifications)

1. First Embodiment

[Introductory Description]

In the first embodiment of the present disclosure (hereinafter, also referred to as the "present example"), the configuration and the method of detecting a conductor such as a metal present near a power transmission apparatus or a power receiving apparatus by using these apparatuses of a contactless power transmission system will be described. Hereinafter, detecting a conductor such as a metal may also be described as "detecting a metal". Conductors herein include conductors in a broad sense, that is, semiconductors.

First, the power transmission efficiency (inter-coil efficiency) between coils of the transmitting side (primary side) and the receiving side (secondary side) in a contactless power transmission system of the magnetic resonance method will be described.

The theoretically maximum value $\eta_{max}$ of the inter-coil efficiency is known to be given by Formula (1):

[Math. 1]

$$\eta_{max} = \frac{S^2}{\left(1+\sqrt{1+S^2}\right)^2} \quad (1)$$

[Math. 2]

$$S = kQ \quad (2)$$

[Math. 3]

$$Q = \sqrt{Q_1 Q_2} \quad (3)$$

Q represents the Q value of the whole contactless power transmission system, $Q_1$ represents the Q value on the primary side, and $Q_2$ represents the Q value on the secondary side. That is, in the magnetic resonance method, the inter-coil efficiency $\eta_{max}$ is theoretically uniquely determined from the coupling coefficient k as a degree of electromagnetic coupling of the primary side coil and the secondary side coil and the Q value ($Q_1$) of the primary side and the Q value ($Q_2$) of the secondary side as Q values of a no-load resonance circuit. Thus, even if the coupling coefficient k is small, power can be transmitted at high efficiency if the Q values of both of the transmitting side and the receiving side are large.

In the present example using electromagnetic coupling, even if the coupling coefficient k is small, the degree of freedom of arrangement of the primary side coil and the secondary side coil is increased by increasing the Q values of a series resonant circuit of the primary side coil and the secondary side coil. As an example, the system is designed by setting the coupling coefficient k of the primary side coil and the secondary side coil to 0.5 or less and the Q value of at least one of the primary side coil and the secondary side coil to 100 or more. This also applies to the second and third embodiments described later. However, the present example is naturally not limited to the above numerical examples.

Now, which parameter is affected by the influence of the metal cabinet on the receiving side will be checked by using Formulas (1) to (3).

The large primary side coil 1 as shown in FIG. 1 and a small secondary side coil are assumed. The coupling coefficient k is a parameter that may change depending on the physical relationship thereof. Japanese Patent Application Laid-Open Publication No. 2008-136311, Japanese Unexamined Patent Application Publication (Translation of PCT Application) No. 2009-504115 and the like propose configurations on the primary side that keep the coupling coefficient k in the magnetic resonance method uniform and the coupling coefficient k can be made uniform by contrivance on the primary side. Thus, the coupling coefficient k is assumed to be kept uniform in the present disclosure and the Q value will be examined below.

Regarding the Q value of the secondary side coil, the secondary side coil is contained inside the metal cabinet of a portable device or the like and thus, the physical relationship between the secondary side coil and the metal cabinet is constant regardless of where the portable device is placed inside the large primary side coil. That is, the Q value of the secondary side coil is considered to be kept constant except that metal foreign matter enters unless a large metal is attached to the primary side coil. The influence of a desk or the like can easily be removed by contrivance like sticking a magnetic body to the side of the plane primary side coil opposed to the desk or the like. Therefore, it is clear that what is affected by the metal cabinet of the portable device is the value of the primary side.

FIGS. 2(a) to 2(c) show measurement conditions when the Q value on the primary side is measured by changing the position of metal.

A spiral coil of 150 mm (vertical)×190 mm (horizontal) around which a litz wire (wire diameter ϕ: 1.0 mm) as a conductor in which a plurality of thin copper wires is twisted is wound is used as the primary side coil 1. A metal piece 6 of 50 mm (vertical)×60 mm (horizontal)×0.05 mm (thickness) regarded as a metal cabinet is used on the secondary side. Two types of the metal piece 6 made of aluminum and stainless are used. Then, measurements are made when the metal piece 6 is in three locations (1) in the center of the primary side coil 1 (FIG. 2(a)), (2) shifted (moved) in the horizontal direction from the center (FIGS. 2(b)), and (3) at an end of the primary side coil 1 (FIG. 2(c)).

Table 1 shows measurement results of the Q value on the primary side for each position of each metal.

TABLE 1

| Metal type | No metal | Aluminum | | | Stainless | | |
|---|---|---|---|---|---|---|---|
| Metal position | — | (1) | (2) | (3) | (1) | (2) | (3) |
| Primary side Q value | 212.9 | 174.8 | 151.1 | 173.1 | 55.45 | 47.21 | 89.33 |

Measurement results shown in Table 1 also verify that the Q value on the primary side changes considerably depending on the position of the metal piece 6 or the material of the metal. From the above Formulas (1) to (3), the Q value on the primary side significantly affects the inter-coil efficiency (eddy-current loss) and thus, it is clear that the degradation of inter-coil efficiency (increased eddy-current loss) is dominated by variations of an affecting degree of the metal cabinet rather than small metal foreign matter and it is difficult to detect small metal foreign matter.

Thus, setting a threshold taking the influence of the metal cabinet on the secondary side into consideration is examined by measuring the dynamically changing Q value on the primary side and using the inter-coil efficiency and the Q value on the primary side.

[Measurement Principle of the Q Value]

The measurement principle of the Q value on the primary side will be described with reference to FIG. 3.

FIG. 3 shows an outline of a power transmission apparatus (primary side) used in a contactless power transmission system according to the first embodiment of the present disclosure. The circuit of a power transmission apparatus 10 shown in FIG. 3 is an example of the most basic circuit configuration (in the case of magnetic coupling) representing the measurement principle of the Q value in the primary side. The Q value measurement using the circuit is a technique used also by measuring devices and is publicly known. The circuit configuration of the power transmission apparatus 10 and the Q value measuring method will briefly be described below.

If a metal piece is present near a primary side coil 15 of the power transmission apparatus 10, magnetic lines of force pass through the metal and an eddy current is caused in the metal. When viewed from the primary side coil 15, the metal and the primary side coil 15 are electromagnetically coupled to attach a real resistance load to the primary side coil 15, changing the Q value on the primary side. Measuring the Q value could lead to detection of a metal (electromagnetically coupled state) present near the primary side coil 15.

The power transmission apparatus 10 in the present example includes a signal source 11 containing an AC power supply 12 that generates an AC signal and a resistance element 13, a capacitor 14, and the primary side coil 15 (power transmission coil). The resistance element 13 is an illustration of an internal resistance (output impedance) of the AC power supply 12. The capacitor 14 and the primary side coil 15 (example of the coil) are connected to the signal source 11 so as to form a series resonant circuit (example of the resonance circuit). Then, the value (C value) of capacitance of the capacitor 14 and the value (L value) of inductance of the primary side coil 15 are adjusted so that resonance is produced at a frequency at which measurement should be made. The transmission unit including the signal source 11 and the capacitor 14 transmits power to the outside through the primary side coil 15 in a non-contact manner.

If the voltage between the primary side coil 15 and the capacitor 14 constituting the series resonant circuit is V1 (example of voltage applied to a resonance circuit) and the voltage between both ends of the primary side coil 15 is V2, the Q value of the series resonant circuit is represented by Formula (4).

[Math. 4]

$$Q = \frac{V2}{V1} = \frac{2\pi fL}{r_s} \qquad (4)$$

rs: Effective resistance at a frequency f

The voltage V1 is multiplied by Q and the voltage V2 is obtained. When a metal piece approaches the primary side coil 15, the effective resistance rs increases and the Q value falls. Thus, when a metal piece approaches the primary side coil 15, the measured Q value (electromagnetically coupled state) changes.

Generally, if the Q value of a capacitor is Qc and the Q value of a coil is QL, the Q value of a resonance circuit is represented by the relationship 1/{(1/Qc)+(1/QL)}. The Q value of the capacitor 14 used for the measurement is designed to be sufficiently larger than the Q value of the primary side coil 15 and the influence thereof on the Q value of the series resonant circuit can be ignored. However, the Q value of the primary side coil 15 may be designed to be sufficiently larger than the Q value of the capacitor 14 or both may have comparable Q values.

Figure 4:
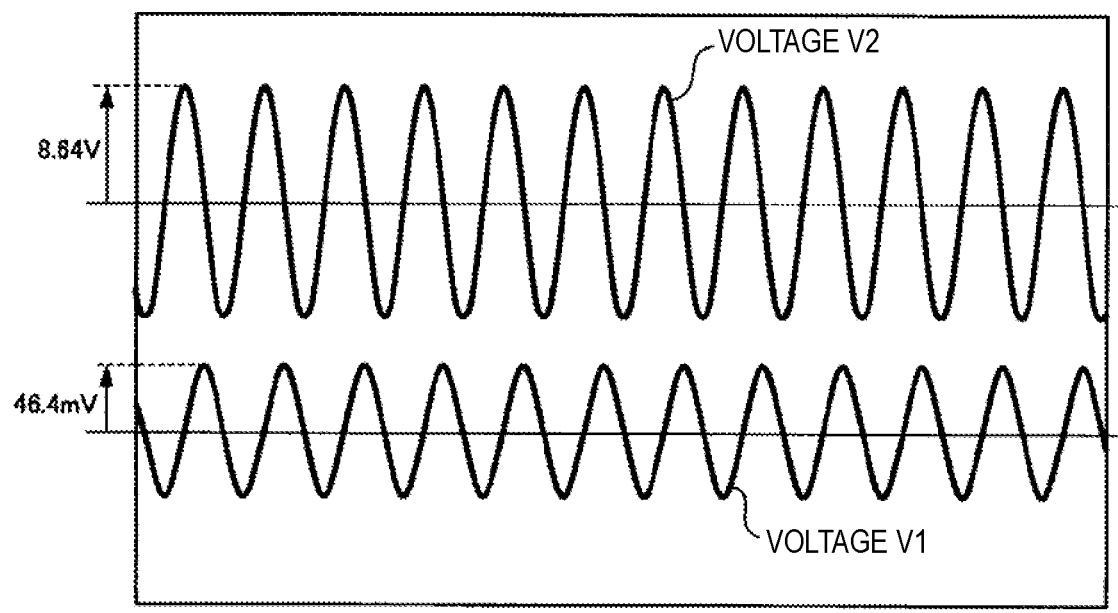
FIG. 4 is a waveform chart of a voltage V1 and a voltage V2 of the power transmission apparatus shown in FIG. 3.

An example of waveforms when the voltage V2 between both ends of the primary side coil 15 and the voltage V1 between the primary side coil 15 and the capacitor 14 when a sine wave of a predetermined frequency is generated by the AC power supply 12 for confirmation is shown in FIG. 4.

In this example, the amplitude of the voltage V2 of the sine wave is 8.64 V and the amplitude of the voltage V1 is 46.4 mV and thus, the amplitude of the voltage V2 of the sine wave is about 186 times the amplitude of the voltage V1 and the Q value of the series resonant circuit is considered to be 186.

The series resonant circuit of the power transmission apparatus 10 has been described, but the power receiving apparatus similarly has a resonance circuit. FIG. 3 shows a basic circuit on the transmitting side including the series resonant circuit and thus, various forms can be considered for a detailed configuration as long as the function of the above circuit is included.

[Electromagnetically-coupled State Detection Method]

The coupled state detection method using the primary side Q value according to the first embodiment of the present disclosure will be described below.

From Formulas (2), (3) to calculate the inter-coil efficiency in the magnetic resonance method described above, [Math. 5] and [Math. 6] are obtained.

[Math. 5]

$$K\sqrt{Q_2} = X \qquad (5)$$

[Math. 6]

$$S = \sqrt{Q_1} X \qquad (6)$$

Substituting S in Formula (6) into Formula (1) yields an equation of three variables $\eta_{max}$, $Q_1$, X excluding $Q_2$. If the primary side Q value ($Q_1$) and the value of inter-coil efficiency $\eta_{max}$ are known, the value of X is determined. The primary side Q value ($Q_1$) can be measured by the above method and the value of inter-coil efficiency $\eta_{max}$ can be measured by the technique (to monitor the current value and voltage value on the primary side and the current value and voltage value on the secondary side) described in Patent Literature 2 (see [0041] to [0043] and so on).

As shown in Formula (5), the value of X is a formula obtained by omitting variations of the Q value on the primary side from the value of the inter-coil efficiency $\eta_{max}$ and thus, the influence of variations of the primary side Q value resulting from the metal cabinet can be reduced by detecting metal foreign matter using the value of X. Substituting Formula (6) into Formula (1) and making X the subject thereof yields, $$X = -\frac{\sqrt[2]{\dfrac{\eta_{max}}{Q_1}}}{\eta_{max} - 1} \qquad (7)$$

and the value of X can be determined in real time from the measured two variables ($Q_1$, $\eta_{max}$).

[Configuration Example of the Power Transmission Apparatus]

Next, a concrete example of the power transmission apparatus (primary side) according to the first embodiment of the present disclosure will be described.

Figure 5:
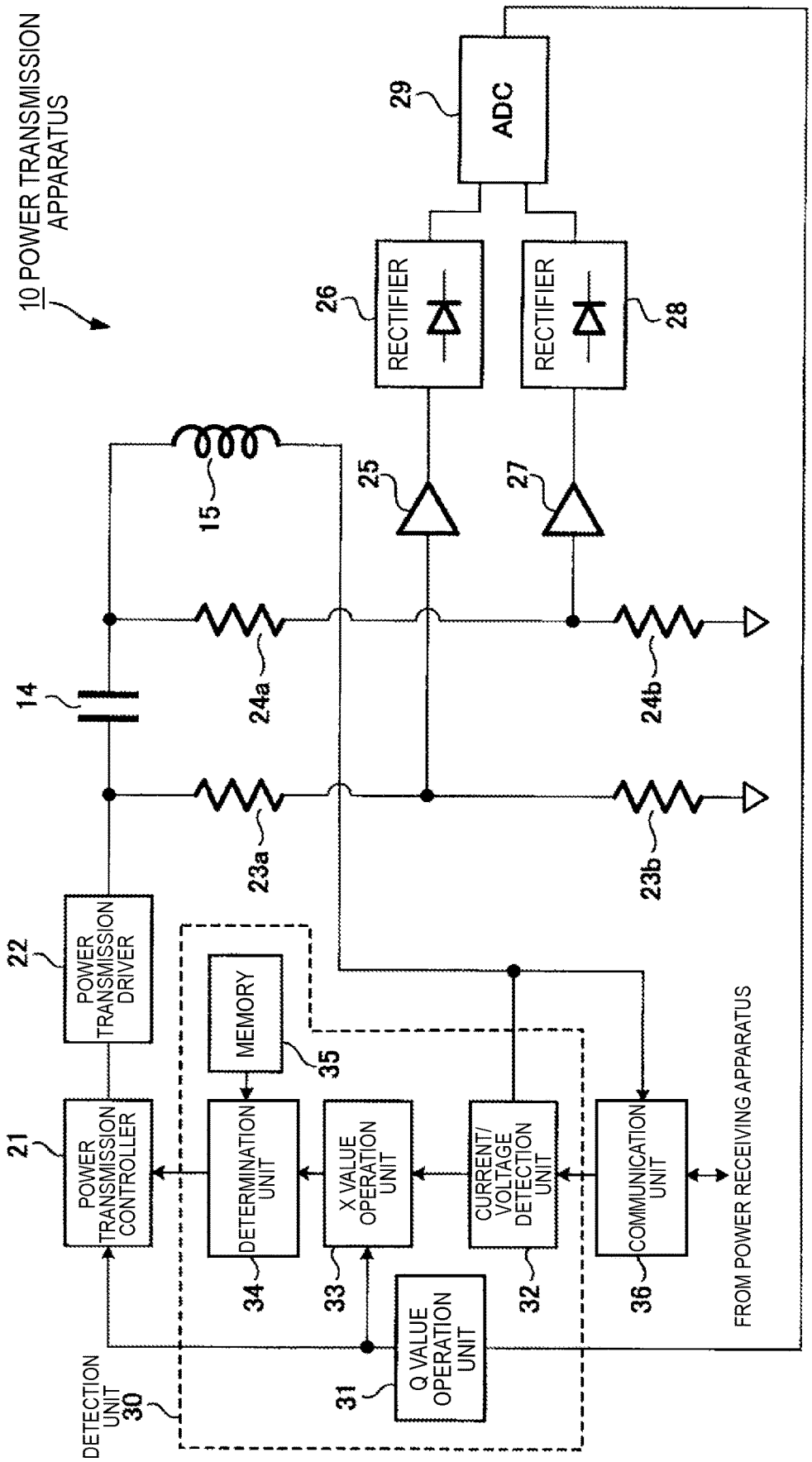
FIG. 5 is a block diagram showing an internal configuration example of the power transmission apparatus (primary side) according to the first embodiment of the present disclosure.

FIG. 5 is a block diagram showing a detailed internal configuration example of the power transmission apparatus (primary side) equipped with the function to measure the primary side Q value. The power transmission apparatus 10 includes a detection circuit that detects a conductor such as a metal by the above electromagnetically-coupled state detection method. The power transmission apparatus 10 constitutes a contactless power transmission system in combination with a power receiving apparatus described later.

The power transmission apparatus 10 includes a power transmission controller 21, a power transmission driver 22, the capacitor 14 and the primary side coil 15 constituting a series resonant circuit, resistance elements for voltage division 23a, 23b, 24a, 24b, amplifiers 25, 27, rectifiers 26, 28, and an analog-digital converter (hereinafter, "ADC") 29. Further, a detection unit 30 and a communication unit 36 are included. The detection unit 30 and the communication unit 36 are new when compared with conventional technology.

In the power transmission apparatus 10 in the present example, a series circuit of the resistance element 23a and the resistance element 23b is connected to one end of the capacitor 14 and a series circuit of the resistance element 24a and the resistance element 24b is connected to the other end thereof. Then, a signal (corresponding to the voltage V1) whose voltage is divided into an appropriate voltage by the resistance element 23a and the resistance element 23b is supplied to the ADC 29 via the amplifier 25 and the rectifier 26. Similarly, a signal (corresponding to the voltage V2) whose voltage is divided into an appropriate voltage by the resistance element 24a and the resistance element 24b is input into the ADC 29 via the amplifier 27 and the rectifier 28. The ADC 29 converts an analog DC signal rectified by the rectifier 26 and the rectifier 28 into a digital DC signal and outputs the digital DC signal to the detection unit 30.

The detection unit 30 is an example of the controller and the whole or a portion thereof is configured by, for example, an MPU (Micro-Processing Unit) to control the whole power transmission apparatus 10. The detection unit 30 includes a Q value operation unit 31, a current/voltage detection unit 32, an X value operation unit 33, a function as a determination unit 34, and a memory 35, outputs a control signal to the power transmission controller 21, and controls the generation of an AC voltage.

The Q value operation unit 31 calculates the primary side Q value (=V2/V1) by dividing the amplitude of a signal corresponding to the voltage V2 across the primary side coil 15 output from the ADC 29 by the amplitude of a signal corresponding to the voltage V1 between the primary side coil 15 and the capacitor 14 and outputs the calculation result to the X value operation unit 33. The Q value operation unit 31 also outputs the calculation result to the power transmission controller 21. By dividing the amplitude of each signal in this manner, the primary side Q value is measured in real time.

The current/voltage detection unit 32 detects an induced voltage (primary side voltage) and an induced current (primary side current) generated in the primary side coil 15 and outputs detection results to the X value operation unit 33. In addition, the communication unit 36 receives information of an induced voltage (secondary side voltage) and an induced current (secondary side current) generated in the secondary side coil from the power receiving apparatus and the current/voltage detection unit 32 outputs the information to the X value operation unit 33.

The X value operation unit 33 is an example of a corrected value operation unit and calculates primary side power as a product of the primary side voltage and the primary side current input from the current/voltage detection unit 32 and also calculates secondary side power as a product of the secondary side voltage and the secondary side current received by the communication unit 36. Then, the X value operation unit 33 calculates the inter-coil efficiency $\eta_{max}$ as a ratio of the primary side power to the secondary side power. The X value operation unit 33 calculates an X value according to Formula (7) using the primary side Q value ($Q_1$) input from the Q value operation unit 31 and the value of the inter-coil efficiency $\eta_{max}$ and outputs the X value to the determination unit 34. Incidentally, the operation of the inter-coil efficiency $\eta_{max}$ may be performed by the current/voltage detection unit 32.

The determination unit 34 compares the X value input from the X value operation unit 33 with the threshold stored in the nonvolatile memory 35 and determines whether a conductor such as a metal is present nearby based on the comparison result. For example, if the measured X value is compared with the threshold (for example, 90% when there is no metal foreign matter) and the X value is smaller than 90%, the determination unit 34 may determine that metal foreign matter is present between the primary side coil and the secondary side coil. The primary side Q value and the threshold of the X value in a state in which nothing is present near the primary side coil 15 or nothing is placed in the secondary side coil are measured in advance and measured values are stored in the memory 35.

The communication unit 36 is an example of a primary side communication unit and performs communication with the communication unit of the power receiving apparatus described later. For example, the communication unit 36 receives information of an induced voltage (secondary side voltage) and an induced current (secondary side current) generated in the secondary side coil of the power receiving apparatus and notifies the power receiving apparatus that the Q value is being measured according to the control of a detection circuit 20. As the communication standard, for example, the wireless LAN or Bluetooth (registered trademark) of the IEEE802.11 standard can be used. Incidentally, a configuration to transmit information via the primary side coil 15 and the secondary side coil of the power receiving apparatus may be adopted.

[Configuration Example of the Power Receiving Apparatus]

Next, a concrete example of the power receiving apparatus (secondary side) according to the first embodiment of the present disclosure will be described.

Figure 6:
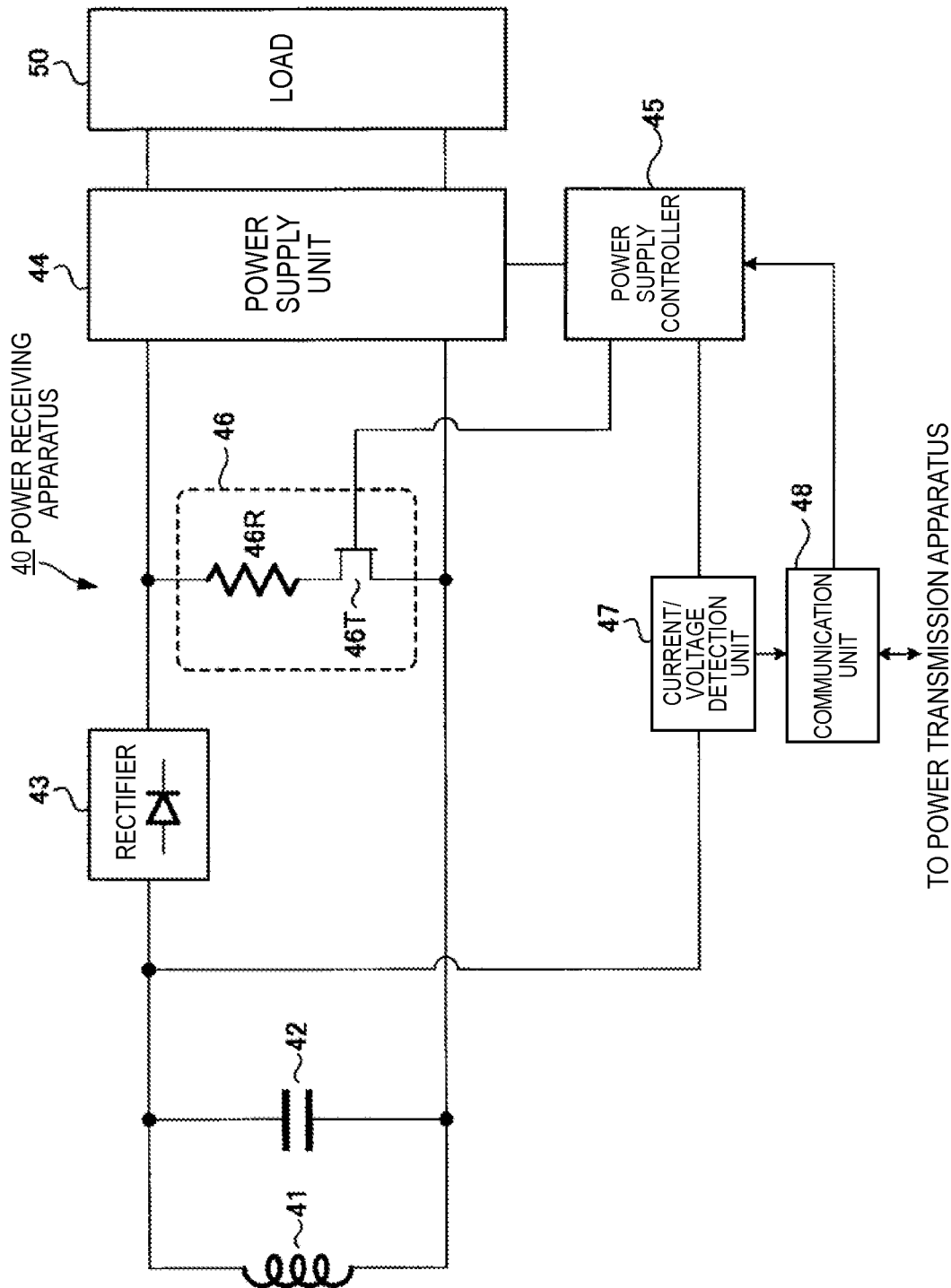
FIG. 6 is a block diagram showing an internal configuration example of a power receiving apparatus (secondary side) according to the first embodiment of the present disclosure.

FIG. 6 is a block diagram showing an internal configuration example of a power receiving apparatus (secondary side) applied to portable devices. A power receiving apparatus 40 includes a secondary side coil 41 and a capacitor 42 forming a parallel resonant circuit, a rectifier 43, a power supply unit 44, a power supply controller 45, a load modulation unit 46, a current/voltage detection unit 47, and a communication unit 48. The circuit configuration of the power receiving apparatus 40 in the present example is a known circuit and so will briefly be described below.

In the power receiving apparatus 40, a parallel resonant circuit comprising the secondary side coil 41 and the capacitor 42 is connected to the power supply unit 44 via the rectifier 43. The value (C value) of capacitance of the capacitor 42 and the value (L value) of inductance of the secondary side coil 41 are adjusted so that resonance is produced at a frequency at which measurement should be made. The power receiving unit configured by the capacitor 42 and the rectifier 43 receives power from outside through the secondary side coil 41 in a non-contact manner. An AC induced voltage of the secondary side coil 41 is supplied to the power supply unit 44 after being converted into a DC voltage by the rectifier 43.

The power supply unit 44 generates a power supply voltage by adjusting the voltage level of the DC voltage obtained after conversion by the rectifier 43 and supplies the power to a load 50 or each block. The load 50 is, for example, a capacitor (secondary battery), an electronic circuit that processes an electric signal or the like.

The power supply controller 45 controls the generation of a power supply voltage by the power supply unit 44 and the supply of power to the load 50 or the like. The power supply controller 45 also controls the operation of the load modulation unit 46.

The load modulation unit 46 performs load modulation processing according to the control of the power supply controller 45. When the Q value is measured by the power transmission apparatus 10 (primary side), the primary side Q value changes, leading to an error under conditions where the load of the power receiving apparatus 40 (secondary side) changes. Thus, it is desirable to measure the load on the primary side under conditions where the load on the secondary side is constant.

Thus, the load modulation unit 46 configured by a resistance element 46R and a switching element 46T connected in series is connected in parallel prior to the power supply unit 44. Then, while the power transmission apparatus 10 measures the Q value, the power supply controller 45 receives a notification that the power transmission apparatus 10 is measuring the Q value via the communication unit 48 and turns on the switching element. The influence of the load 50 can be curbed by making the resistance of the resistance element 46R sufficiently larger than the resistance of the load 50. Thus, by controlling the load modulation unit 46 prior to the power supply unit 44, the load resistance on the secondary side when the primary side Q value is measured can be made constant. Accordingly, the precision of measurement of the primary side Q value can be improved. As the switching element 46T, as an example, a transistor such as a power MOS transistor can be used.

The current/voltage detection unit 47 detects an induced voltage (secondary side voltage) and an induced current (secondary side current) generated in the secondary side coil 41 and outputs detection results to the communication unit 48.

The communication unit 48 is an example of a secondary side communication unit and performs communication with the communication unit 36 of the power transmission apparatus 10. For example, the communication unit 48 transmits information of an induced voltage (secondary side voltage) and an induced current (secondary side current) generated in the secondary side coil 41 of the power receiving apparatus 40 to the power transmission apparatus 10 and receives a notification that the Q value is being measured from the power transmission apparatus 10. The communication standard applied to the communication unit 36 of the power transmission apparatus 10 is similarly applied.

The present example is described by assuming that the power transmission apparatus 10 has only the power transmission function and the power receiving apparatus 40 has only the power receiving function, but the present disclosure is not limited to such an example. For example, the power transmission apparatus 10 may have the power receiving function so that power can be received from outside through the primary side coil 15 or conversely, the power receiving apparatus 40 may have the power transmission function so that power can be transmitted to the outside through the secondary side coil 41.

[Correction Effect of Variations of the Primary Side Q Value Resulting from the Metal Cabinet]

The correction effect of variations of the primary side Q value resulting from the metal cabinet by the coupled state detection method according to the first embodiment of the present disclosure will be described.

FIGS. 7(a) to 7(c) show measurement conditions when each parameter is measured by changing the metal type of the metal cabinet of the portable device. Condition (1) is a case when aluminum mainly possessed by the secondary side (portable device 4A) is assumed to be opposed to the primary side (FIG. 7(a)). Condition (2) is a case when small metal foreign matter 5 is assumed to be mingled in (1) (FIG. 7(b)). In (2), the large metal cabinet is visible from the primary side and thus, the primary side Q value hardly changes even if the small metal foreign matter 5 is mingled. On the other hand, the secondary side Q value and the coupling coefficient k are degraded under the influence of the metal cabinet. Further, Condition (3) is a case when stainless mainly possessed by the secondary side (portable device 4B) is assumed to be opposed to the primary side (FIG. 7(c)).

Table 2 shows measurement results when each parameter is measured in the above Conditions (1) to (3).

TABLE 2

| Condition | Primary side Q value | Secondary side Q value | Coupling coefficient | S value | Inter-coil efficiency | X value |
| --- | --- | --- | --- | --- | --- | --- |
| (1) | 170 | 60 | 0.08 | 8.079603951 | 78.12116123 | 0.619677 |
| (2) | 170 | 30 | 0.07 | 4.9989999 | 67.20257032 | 0.383406 |
| (3) | 40 | 50 | 0.08 | 3.577708764 | 57.58070118 | 0.565685 |

From (3) of Table 2, it is clear that the primary side Q value significantly degraded with the portable device 4A having the metal cabinet of stainless being brought closer to the primary side coil 15. The metal size in Table 1 described above is 50 mm (vertical)×60 mm (horizontal), but the metal cabinet of a portable device may be a bit larger and is determined to be degraded and so the Q value on the primary side is assumed to be 40. The Q value on the secondary side and the coupling coefficient k in Condition (3) are assumed to be approximately equal to those in Condition (1). Results of calculating the inter-coil efficiency and the X value under these conditions are shown in Table 2.

If the inter-coil efficiency in Table 2 is focused on, it is clear that the influence of the metal cabinet is greater than that of metal foreign matter and the inter-coil efficiency (57.58070118) in (3) is below the inter-coil efficiency (67.20257032) in (2) in which metal foreign matter is mingled. This makes it difficult to detect metal foreign matter with high precision even if the threshold is set. On the other hand, if the X value is focused on, the value is lower (0.383406) in (2) in which metal foreign matter is mingled. Thus, by subtracting the influence of the metal cabinet when the electromagnetically-coupled state using the X value, the precision of detecting metal foreign matter can be improved. Incidentally, a more conspicuous difference arises between the X value when the metal cabinet is present in the portable device and the X value when no metal cabinet is present.

[Metal Foreign Matter Detection Processing]

Figure 8:
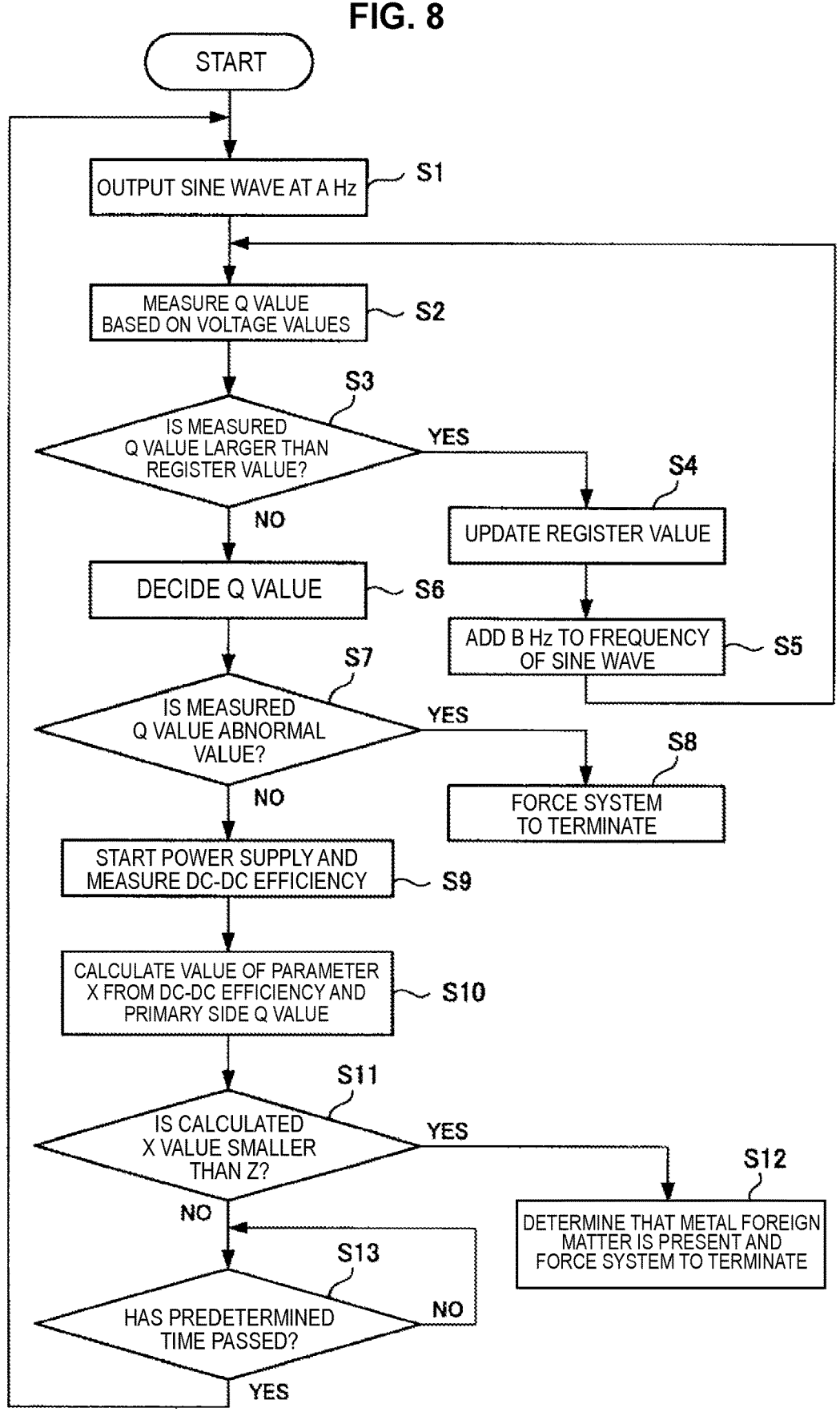
FIG. 8 is a flow chart showing an example of metal foreign matter detection processing according to the first embodiment of the present disclosure.

Next, an example of metal foreign matter detection processing according to the first embodiment of the present disclosure will be described with reference to the flow chart in FIG. 8.

First, the detection unit 30 (see FIG. 5) of the power transmission apparatus 10 needs to search for the maximum Q value on the primary side by sweeping the frequency of the sine wave generated by the AC power supply. That is, the frequency of the sine wave output from the power transmission apparatus 10 is continuously changed to scan for the maximum Q value on the primary side. For example, the power transmission driver 22 (see FIG. 5) generates and outputs a sine wave of any A Hz (step S1) and the Q value operation unit 31 measures the primary side Q value from the voltage V1 and the voltage V2 of the power transmission apparatus 10 (step S2).

The detection unit 30 determines whether the measured primary side Q value is larger than the value (hereinafter, referred to as the "register value") stored in the register (example of a temporary storage unit) (not shown) included in the detection unit 30 (step S3). A work memory (not shown) or the memory 35 may be caused to store the value.

If, in the determination processing in step S3, the primary side Q value is larger than the register value, the detection unit 30 updates the register value (step S4) and next increases the frequency of the sine wave by B Hz from A Hz (step S5). Then, the detection unit 30 generates and outputs a sine wave of (A+B) Hz through the power transmission driver 22 to measure the primary side Q value in step S2. Then, the processing proceeds to step S3.

On the other hand, if the primary side Q value is smaller than the register value in the determination processing in step S3, the detection unit 30 determines the primary side Q value (step S6).

The detection unit 30 determines whether the determined primary side Q value is an abnormal value (step S7). If the determined primary side Q value is an abnormal value (outside the range of threshold), the detection unit 30 forcibly terminates the operation of the power transmission apparatus 10 (step S8). Incidentally, the processing in steps S7, S8 may be omitted.

If the determined primary side Q value is a normal value (inside the range of threshold) in the determination processing in step S7, the detection unit 30 starts transmission of power from the power transmission apparatus 10 to the power receiving apparatus 40 and also the X value operation unit 33 calculates the DC-DC efficiency, that is, the inter-coil efficiency (step S9).

The X value operation unit 33 calculates the X value (see Formula (7)) from the inter-coil efficiency and the primary side Q value using Formula (7) (step S10).

The determination unit 34 determines whether the calculated X value is equal to or less than a threshold Z stored in the memory 35 (step S11). If the X value is equal to or less than the threshold Z, the determination unit 34 determines that metal foreign matter is present and forcibly terminates the transmission power (step S12).

On the other hand, if the X value is more than the threshold Z, the determination unit 34 determines that there is no metal foreign matter and continues to transmit power. By performing the sequence of processing at certain intervals, metal foreign matter can be detected without being affected by the metal cabinet. That is, the determination unit 34 determines whether a predetermined time has passed (step S13) and, if the predetermined time has passed, proceeds to step S1 to repeat the sequence of processing in steps S1 to S13.

[Effect of the First Embodiment]

According to the first embodiment, the Q value of the power transmission apparatus 10 (primary side) and the inter-coil efficiency (power transmission efficiency) of the contactless power transmission system and the inter-coil efficiency is corrected based on the primary side Q value. Then, the fact that the obtained corrected value (X value) has changed from the threshold when there is no obstacle is detected and the presence of metal foreign matter near the contactless power transmission system is detected. Therefore, the influence of the metal cabinet on the secondary side (such as a portable device) is corrected so that the precision of detecting metal foreign matter can be improved.

In addition, when the second side coil is placed in any location with respect to the plane primary side coil, the influence of variations of the position of the secondary side coil in a plane of the primary side coil can be reduced.

Therefore, safety of the user and improvement of usability can be achieved.

Figure 9A:
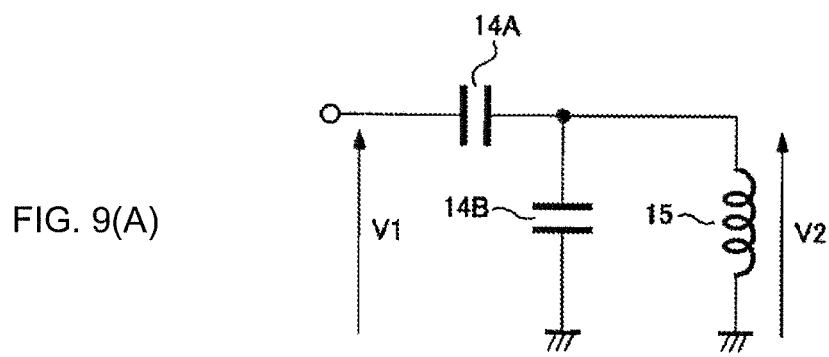
FIGS. 9(a) and 9(b) are circuit diagrams showing other examples (parallel resonant circuit) of a resonance circuit.
Figure 9B:
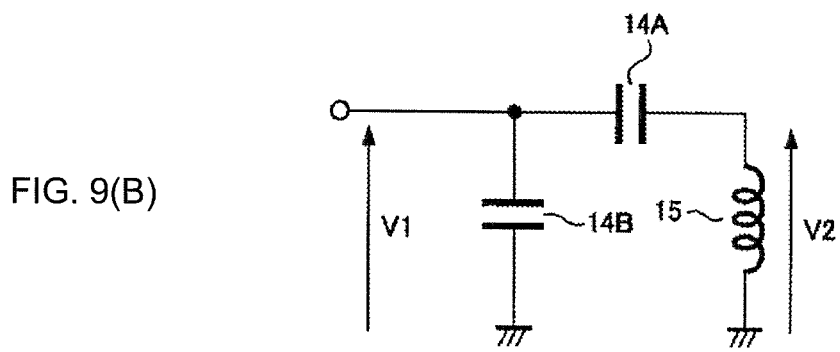

An example in which the power transmission apparatus 10 includes a series resonant circuit is described in the present embodiment, but other resonance circuits may also be used as the resonance circuit. FIGS. 9(a) and 9(b) show respective examples. In the example of FIG. 9(a), a resonance circuit is configured by connecting in series a capacitor 14A to a parallel resonant circuit of a capacitor 14B and the primary side coil 15. In the example of FIG. 9(b), a resonance circuit is configured by connecting in parallel the capacitor 14B to a series resonant circuit of the capacitor 14A and the primary side coil 15. The detection unit 30 calculates the primary side Q value using the voltage V1 between the primary side coil 15 and the capacitor 14A and the voltage V2 between both ends of the primary side coil 15 obtained from the resonance circuits shown in FIGS. 9(a) and 9(b). The series resonant circuit and other resonance circuits are by way of example and the configuration of a resonance circuit is not limited to such examples. Like the power transmission apparatus 10, various resonance circuits can also be applied to the power receiving apparatus 40.

2. Second Embodiment

In the first embodiment, the Q value operation unit 31 of the detection unit 30 determines the Q value from the voltage V1 between a primary side coil and a capacitor of a series resonant circuit and the voltage V2 between both ends of a power transmission coil, but in the second embodiment, the Q value is determined by the half-power band width method.

Figure 10:
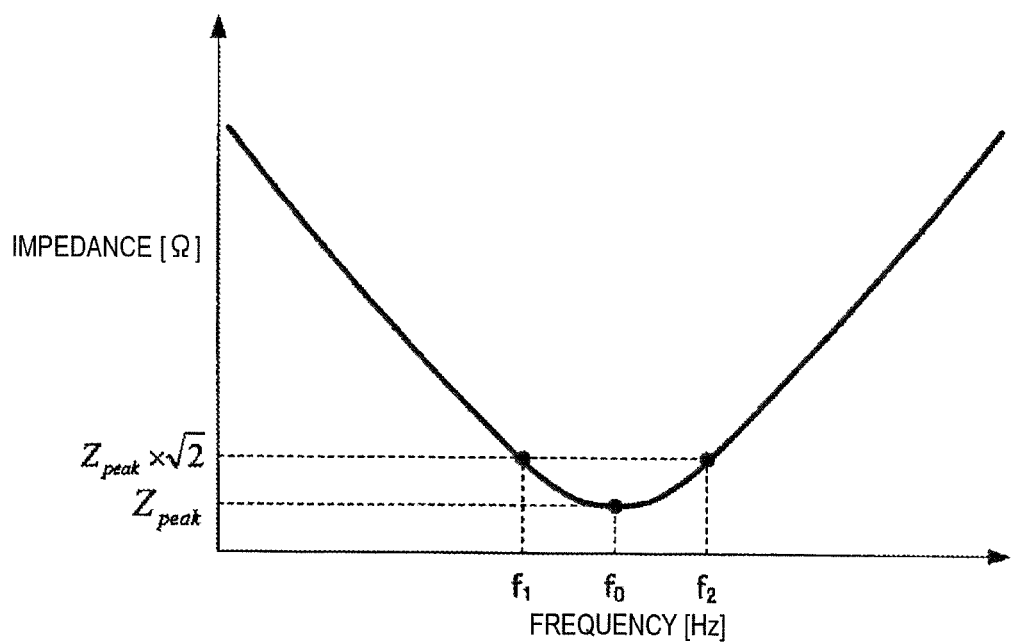
FIG. 10 is a graph showing frequency characteristics of impedance in a series resonant circuit according to a second embodiment of the present disclosure.

In the half-power band width method, when a series resonant circuit is configured, the Q value is determined by Formula (8) from, as shown in the graph of FIG. 10, the band (frequency: f1 to f2) in which the impedance is $\sqrt{2}$ times the absolute value of impedance (Zpeak) at a resonance frequency f0.

[Math. 8]

$$Q = \frac{f_0}{f_2 - f_1} \quad (8)$$

Figure 11:
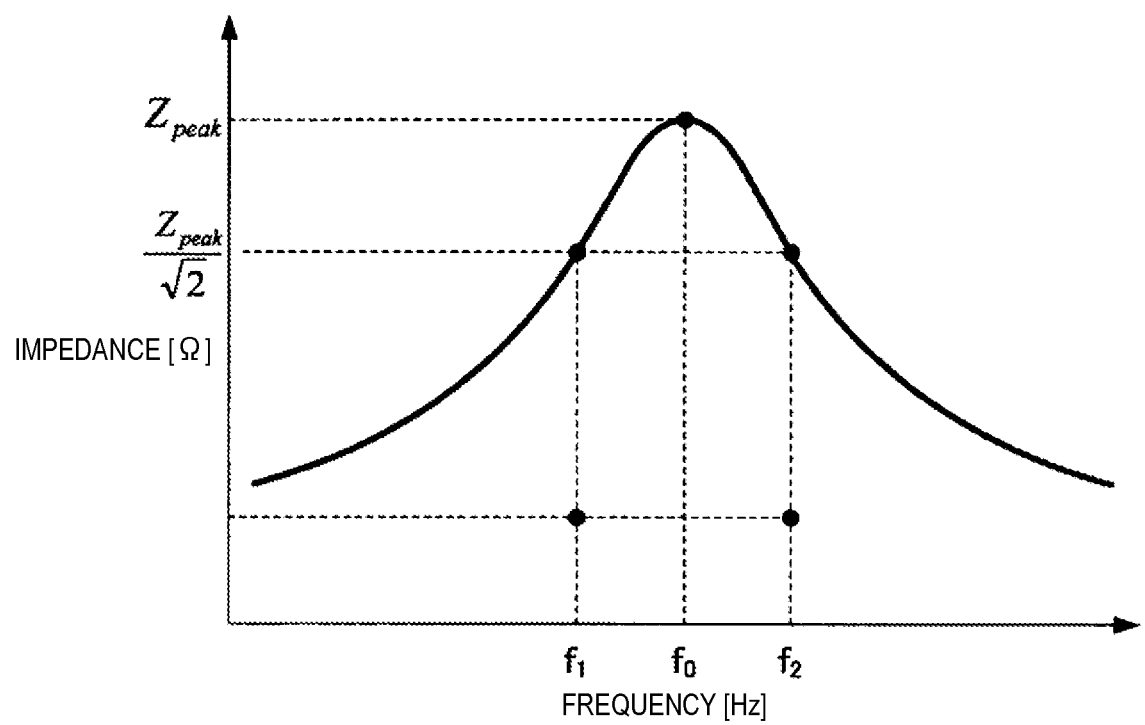
FIG. 11 is a graph showing frequency characteristics of impedance in a parallel resonant circuit according to the second embodiment of the present disclosure.

When a parallel resonant circuit is configured, the Q value is determined by Formula (8) from, as shown in the graph of FIG. 11, the band (frequency: f1 to f2) in which the impedance is 1/√2 times the absolute value of impedance (Zpeak) at the resonance frequency f0.

3. Third Embodiment

In contrast to the first and second embodiments, the third embodiment is an example in which the Q value operation unit 31 of the detection unit 30 calculates the Q value from the real part and the imaginary part of impedance of a resonance circuit. In the present example, the real part and the imaginary part of impedance are determined by using a self-balancing bridge circuit and a vector ratio detector.

Figure 12:
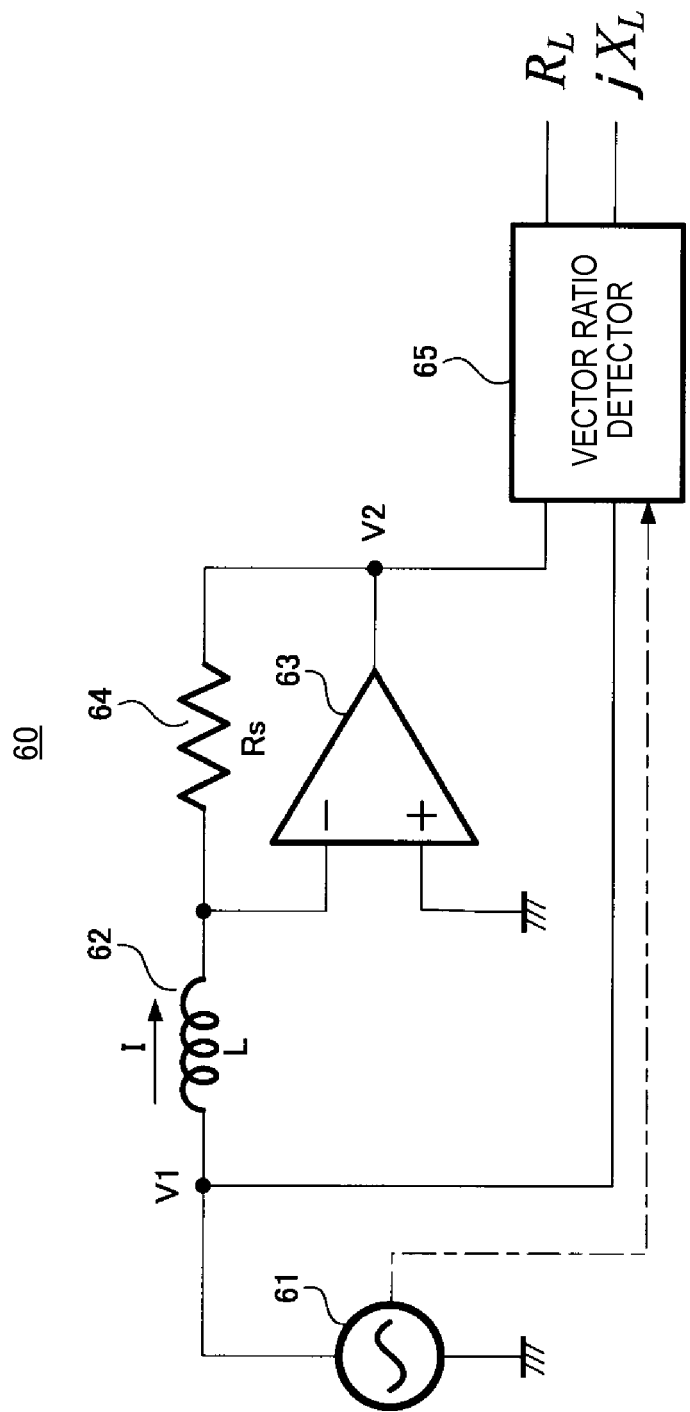
FIG. 12 is a circuit diagram to calculate a Q value from the ratio of a real part and an imaginary part of the impedance according to a third embodiment of the present disclosure.

FIG. 12 is a circuit diagram of a self-balancing bridge to calculate the Q value from the ratio of the real part to the imaginary part of impedance according to the third embodiment.

A self-balancing bridge circuit 60 shown in FIG. 12 has a configuration similar to that of a generally well-known inverting amplifier. A coil 62 is connected to an inverting input terminal (−) of an inverting amplifier 63 and a non-inverting input terminal (+) is connected to the ground. Then, negative feedback is applied by a feedback resistance element 64 to the inverting input terminal (−) from the output terminal of the inverting amplifier 63. Also, the output (voltage V1) of an AC power supply 61 that inputs an AC signal into the coil 62 and the output (voltage V2) of the inverting amplifier 63 are input into a vector ratio detector 65. The coil 62 corresponds to the primary side coil 15 in FIG. 5 or the secondary side coil 41 in FIG. 6.

The self-balancing bridge circuit 60 operates in such a way that the voltage of the inverting input terminal (−) is always zero due to negative feedback. Because the input impedance of the inverting amplifier 63 is large, a current flowing from the AC power supply 61 to the coil 62 flows almost wholly to the feedback resistance element 64. As a result, the voltage applied to the coil 62 becomes equal to the voltage V1 of the AC power supply 61 and the output voltage of the inverting amplifier 63 is equal to the product of a current I flowing through the coil 62 and a feedback resistance Rs. The feedback resistance Rs is a known reference resistance. Therefore, the impedance is determined by detecting the voltage V1 and the voltage V2 and calculating a ratio thereof. The vector ratio detector 65 uses phase information (alternate long and short dash line) of the AC power supply 61 to determine the voltage V1 and the voltage V2 as complex numbers.

In the present example, a real part RL and an imaginary part XL of an impedance ZL of a resonance circuit are determined by using the self-balancing bridge circuit 60, the vector ratio detector 65 and the like and the Q value is determined from the ratio thereof. Formulas (9) and (10) are calculation formulas showing the process of determining the Q value.

[Math. 9]

$$Z_L = R_L + jX_L = \frac{V1}{I} = \frac{V1}{V2} Rs \quad (9)$$

[Math. 10]

$$Q = \frac{X_L}{R_L} \quad (10)$$

4. Others

In the first to third embodiment of the present disclosure described above, the Q value is measured at the resonance frequency, but if a slight decrease in detection sensitivity is permitted, the frequency at which the Q value is measured does not necessarily need to match the resonance frequency and the Q value measured at a frequency deviating from the resonance frequency may also be used.

When the present disclosure is applied to the electromagnetic induction method, it is better to increase the Q value on the primary side and/or the secondary side. Accordingly, changes of the inter-coil efficiency, that is, changes of the X value can be detected more easily.

Examples of coils having no core are described as the primary side coil and the secondary side coil according to the present disclosure, but a coil having a structure in which a thin conductor is wound around a core having a magnetic body may also be adopted.

Further, examples of applying a portable phone as a portable device on the secondary side are described in the first to third embodiments of the present disclosure, but the present disclosure is not limited to such examples and can be applied to various portable devices that need power such as a portable music player, digital still camera and the like.

Additionally, the present disclosure may also be configured as below.

(1) An electromagnetically-coupled state detection circuit including:

a detection unit that measures a primary side Q value of a circuit containing a primary side coil electromagnetically coupled with a secondary side coil and power transmission efficiency to the secondary side coil, corrects the power transmission efficiency based on the Q value of the primary side coil, and detects a state of electromagnetic coupling with the secondary side coil based on an obtained corrected value of the power transmission efficiency.

(2) The electromagnetically-coupled state detection circuit according to (1), wherein whether a conductor is present near the secondary side coil is determined by detecting the state of electromagnetic coupling with the secondary side coil.

(3) The electromagnetically-coupled state detection circuit according to (2), wherein the Q value is the Q value of a resonance circuit containing the primary side coil and a capacitor.

(4) The electromagnetically-coupled state detection circuit according to (3), wherein the detection unit includes a Q value operation unit that acquires a first voltage applied to between the primary side coil of the resonance circuit containing the primary side coil and the capacitor and the capacitor and a second voltage applied to between both ends of the primary side coil, and calculates the primary side Q value from a ratio of the first voltage to the second voltage, a corrected value operation unit that calculates a corrected value according to a formula below $$-\frac{\sqrt[2]{\frac{\eta_{max}}{Q_1}}}{\eta_{max}-1}$$

when the primary side Q value is $Q_1$ and the power transmission efficiency is $\eta_{max}$, and
   a determination unit that determines the state of electromagnetic coupling with the secondary side coil by comparing the corrected value calculated by the corrected value operation unit with a threshold set based on a corrected value measured in advance when no conductor is present near the primary side coil.
(5) The electromagnetically-coupled state detection circuit according to (3),
   wherein the detection unit includes
   a Q value operation unit that calculates the primary side Q value using a half-power band width method that determines the Q value from a band where impedance is $\sqrt{2}$ times an absolute value of the impedance at a resonance frequency of a series resonant circuit containing the primary side coil and the capacitor,
   a corrected value operation unit that calculates a corrected value according to a formula below $$-\frac{\sqrt[2]{\frac{\eta_{max}}{Q_1}}}{\eta_{max}-1}$$

when the primary side Q value is $Q_1$ and the power transmission efficiency is $\eta_{max}$, and
   a determination unit that determines the state of electromagnetic coupling with the secondary side coil by comparing the corrected value calculated by the corrected value operation unit with a threshold set based on a corrected value measured in advance when no conductor is present near the primary side coil.
(6) The electromagnetically-coupled state detection circuit according to (3), further including:
   a Q value operation unit that calculates the primary side Q value using a half-power band width method that determines the Q value from a band where impedance is $1/\sqrt{2}$ times an absolute value of the impedance at a resonance frequency of a parallel resonant circuit containing the primary side coil and the capacitor;
   a corrected value operation unit that calculates a corrected value according to a formula below $$-\frac{\sqrt[2]{\frac{\eta_{max}}{Q_1}}}{\eta_{max}-1}$$

when the primary side Q value is $Q_1$ and the power transmission efficiency is $\eta_{max}$; and
   a determination unit that determines the state of electromagnetic coupling with the secondary side coil by comparing the corrected value calculated by the corrected value operation unit with a threshold set based on a corrected value measured in advance when no conductor is present near the primary side coil.

(7) The electromagnetically-coupled state detection circuit according to (3), further including:
   a Q value operation unit that determines a real part and an imaginary part of impedance of the resonance circuit using a self-balancing bridge circuit and a vector ratio detector, and calculates the primary side Q value from a ratio thereof; and
   a determination unit that determines the state of electromagnetic coupling with the secondary side coil by comparing the primary side Q value determined by the Q value operation unit with a threshold set based on the primary side Q value measured in advance when no conductor is present near the primary side coil.
(8) The electromagnetically-coupled state detection circuit according to (4),
   wherein the power transmission efficiency is a ratio of primary side power as a product of an induced voltage and an induced current of the primary side coil to secondary side power as a product of an induced voltage and an induced current of the secondary side coil.
(9) A power transmission apparatus including:
   a primary side coil electromagnetically coupled with a secondary side coil; and
   a detection unit that measures a primary side Q value of a circuit containing the primary side coil and power transmission efficiency to the secondary side coil, corrects the power transmission efficiency based on the Q value of the primary side coil, and detects a state of electromagnetic coupling with the secondary side coil based on an obtained corrected value of the power transmission efficiency.
(10) The power transmission apparatus according to (9),
   wherein whether a conductor is present near the secondary side coil is determined by detecting the state of electromagnetic coupling with the secondary side coil.
(11) The power transmission apparatus according to (10),
   wherein the Q value is the Q value of a resonance circuit containing the primary side coil and a capacitor.
(12) The power transmission apparatus according to (11),
   wherein the detection unit includes
   a Q value operation unit that acquires a first voltage applied to between the primary side coil of the resonance circuit containing the primary side coil and the capacitor and the capacitor, and a second voltage applied to between both ends of the primary side coil, and calculates the primary side Q value from a ratio of the first voltage to the second voltage,
   a corrected value operation unit that calculates a corrected value according to a formula below $$-\frac{\sqrt[2]{\frac{\eta_{max}}{Q_1}}}{\eta_{max}-1}$$

when the primary side Q value is $Q_1$ and the power transmission efficiency is $\eta_{max}$, and
   a determination unit that determines the state of electromagnetic coupling with the secondary side coil by comparing the corrected value calculated by the corrected value operation unit with a threshold set based on a corrected value measured in advance when no conductor is present near the primary side coil.
(13) The power transmission apparatus according to (11),
   wherein the detection unit includes
   a Q value operation unit that calculates the primary side Q value using a half-power band width method that determines the Q value from a band where impedance is √2 times an absolute value of the impedance at a resonance frequency of a series resonant circuit containing the primary side coil and the capacitor, a corrected value operation unit that calculates a corrected value according to a formula below $$-\frac{\sqrt[2]{\frac{\eta_{max}}{Q_1}}}{\eta_{max}-1}$$

when the primary side Q value is $Q_1$ and the power transmission efficiency is $\eta_{max}$, and a determination unit that determines the state of electromagnetic coupling with the secondary side coil by comparing the corrected value calculated by the corrected value operation unit with a threshold set based on a corrected value measured in advance when no conductor is present near the primary side coil.

(14) The power transmission apparatus according to (11), further including:

a Q value operation unit that calculates the primary side Q value using a half-power band width method that determines the Q value from a band where impedance is 1/√2 times an absolute value of the impedance at a resonance frequency of a parallel resonant circuit containing the primary side coil and the capacitor;

a corrected value operation unit that calculates a corrected value according to a formula below $$-\frac{\sqrt[2]{\frac{\eta_{max}}{Q_1}}}{\eta_{max}-1}$$

when the primary side Q value is $Q_1$ and the power transmission efficiency is $\eta_{max}$; and a determination unit that determines the state of electromagnetic coupling with the secondary side coil by comparing the corrected value calculated by the corrected value operation unit with a threshold set based on a corrected value measured in advance when no conductor is present near the primary side coil.

(15) The power transmission apparatus according to (11), further including:

a Q value operation unit that determines a real part and an imaginary part of impedance of the resonance circuit using a self-balancing bridge circuit and a vector ratio detector, and calculates the primary side Q value from a ratio thereof; and a determination unit that determines the state of electromagnetic coupling with the secondary side coil by comparing the primary side Q value determined by the Q value operation unit with a threshold set based on the primary side Q value measured in advance when no conductor is present near the primary side coil.

(16) The power transmission apparatus according to (12), wherein the power transmission efficiency is a ratio of primary side power as a product of an induced voltage and an induced current of the primary side coil to secondary side power as a product of an induced voltage and an induced current of the secondary side coil.

(17) A contactless power transmission system including:

a power transmission apparatus that wirelessly transmits power; and a power receiving apparatus that receives the power from the power transmission apparatus, wherein the power receiving apparatus includes a secondary side coil electromagnetically coupled with a primary side coil of the power transmission apparatus, and a secondary side communication unit that communicates with the power transmission apparatus, and wherein the power transmission apparatus includes the primary side coil electromagnetically coupled with the secondary side coil of the power receiving apparatus, a primary side communication unit that communicates with the power receiving apparatus, and a detection unit that measures a primary side Q value of a circuit containing the primary side coil and power transmission efficiency to the secondary side coil based on information about the power receiving apparatus received by the primary side communication unit, corrects the power transmission efficiency based on the Q value of the primary side coil, and detects a state of electromagnetic coupling with the secondary side coil based on an obtained corrected value of the power transmission efficiency.

(18) An electromagnetically-coupled state detection method including:

measuring a primary side Q value of a circuit containing a primary side coil electromagnetically coupled with a secondary side coil and power transmission efficiency to the secondary side coil; and correcting the power transmission efficiency based on the Q value of the primary side coil and detecting a state of electromagnetic coupling with the secondary side coil based on an obtained corrected value of the power transmission efficiency.

Further, the above sequence of processing in an embodiment can be performed by hardware, but software can also be caused to perform the sequence of processing. When software is caused to perform the sequence of processing, the sequence of processing can be performed by a computer (MPU or the like) in which a program constituting the software is incorporated into dedicated hardware or a computer on which programs to execute various functions are installed.

Processing steps describing chronological processing herein include processing performed chronologically in the order described and also processing that is not necessarily performed chronologically and is performed in parallel or individually (for example, parallel processing or processing by an object).

The present disclosure is not limited to the above embodiments and can naturally adopt various modifications and application examples without deviating from the spirit and scope described in claims.

REFERENCE SIGNS LIST 1 primary side coil
4, 4a, 4b portable device
5 metal foreign matter
6 metal piece
10 power transmission apparatus
11 signal source
12 ac power supply
13 resistance element
14 capacitor 15 primary side coil
21 power transmission controller
22 power transmission driver
30 detection unit
31 q value operation unit
32 current/voltage detection unit
33 x value operation unit
34 determination unit
35 memory
36 communication unit
40 power receiving apparatus
41 secondary side coil
42 capacitor
43 rectifier
44 power supply unit
45 power supply controller
46 load modulation unit
47 current/voltage detection unit
48 communication unit

What is claimed is:

1. A power transmission apparatus comprising:
a primary side coil to be electromagnetically coupled with a secondary side coil; and
a detection unit configured to measure a Q value of the primary side coil and determine whether the measured Q value of the primary side coil is an abnormal value or a normal value,
wherein,
the detection unit is configured to terminate transmission of power from the power transmission apparatus when the measured Q value of the primary side coil is the abnormal value,
the detection unit is configured to start transmission of power from the power transmission apparatus to a power receiving apparatus and to measure a power transmission efficiency of the transmission of power to the secondary coil when the measured Q value of the primary side coil is the normal value, and
the detection unit is configured to resolve whether foreign matter is present between the primary side coil and the secondary coil using the measured Q value of the primary side coil and the measured power transmission efficiency value.

2. The power transmission apparatus according to claim 1, wherein the detection unit is configured to calculate a calculated value based on the the measured Q value of the primary side coil in response to the start of transmission of power from the power transmission apparatus to the power receiving apparatus and the measured power transmission efficiency of the transmission of power to the secondary coil.

3. The power transmission apparatus according to claim 2, wherein the detection unit is configured to compare the calculated value with a first threshold value stored in a memory.

4. The power transmission apparatus according to claim 3, wherein the detection unit is configured to resolve that conductive foreign matter is present between the power transmission apparatus and the power receiving apparatus when the calculated value is less than the first threshold.

5. The power transmission apparatus according to claim 4, wherein the detection unit is configured to re-measure the Q value of the primary side coil when the calculated value is greater than or equal to the first threshold value after the passage of a predetermined time interval.

6. The power transmission apparatus according to claim 2, wherein the detection unit is configured to correct the measured power transmission efficiency value based on the measured primary side Q value and generate a corrected power transmission efficiency value.

7. The power transmission apparatus according to claim 6, wherein the detection unit is configured to determine a state of electromagnetic coupling of the primary side coil with a conductor other than the second side coil by comparing the corrected power transmission efficiency value with a first threshold value.

8. The power transmission apparatus according to claim 7, wherein the detection unit includes:
a Q value operation unit that acquires a first voltage applied to between the primary side coil of the resonance circuit containing the primary side coil and a capacitor and a second voltage applied to between both ends of the primary side coil, and calculates the primary side Q value from a ratio of the first voltage to the second voltage,
a calculated value operation unit that calculates the calculated value according to a formula below $$-\frac{\sqrt[2]{\frac{\eta_{max}}{Q_1}}}{\eta_{max} - 1}$$

where the primary side Q value is $Q_1$ and the power transmission efficiency is $\eta ma$ $\eta_{max}$, and
a determination unit that determines a state of electromagnetic coupling with the secondary side coil by comparing the corrected value calculated by the calculated value operation unit with a threshold value set based on a calculated value measured in advance when no conductor is present near the primary side coil.

9. The power transmission apparatus according to claim 8, wherein the power transmission efficiency is a ratio of primary side power as a product of an induced voltage and an induced current of the primary side coil to secondary side power as a product of an induced voltage and an induced current of the secondary side coil.

10. The power transmission apparatus according to claim 7, wherein the detection unit includes:
a Q value operation unit that calculates the primary side Q value of the primary side coil using a half-power band width method that determines the Q value of the primary side coil from a band where impedance is 2 times an absolute value of the impedance at a resonance frequency of a series resonant circuit containing the primary side coil and a capacitor;
a calculated value operation unit that calculates the calculated value according to a formula below $$-\frac{\sqrt[2]{\frac{\eta_{max}}{Q_1}}}{\eta_{max} - 1}$$

where the primary side Q value is $Q_1$ and the power transmission efficiency is $\eta max$ $\eta_{max}$; and
a determination unit that determines the state of electromagnetic coupling with the secondary side coil by comparing the calculated value calculated by the calculated value operation unit with a threshold value set based on a calculated value measured in advance when no conductor other than the secondary side coil is present near the primary side coil.

11. The power transmission apparatus according to claim 7, further comprising:
- a Q value operation unit that calculates the Q value of the primary side coil using a half-power band width method that determines the Q value of the primary side coil from a band where impedance is $1/\sqrt{2}$ times an absolute value of the impedance at a resonance frequency of a parallel resonant circuit containing the primary side coil and a capacitor;
- a calculated value operation unit that calculates the calculated value according to a formula below $$-\frac{2\sqrt{\frac{\eta_{max}}{Q_1}}}{\eta_{max}-1}$$

where the primary side Q value is $Q_1$ and the power transmission efficiency is µmax $\eta_{max}$; and
- a determination unit that determines the state of electromagnetic coupling of the primary side coil with the secondary side coil by comparing the calculated value calculated by the calculated value operation unit with a threshold set based on a calculated value measured in advance when no conductor is present near the primary side coil.

12. The power transmission apparatus according to claim 7, further comprising:
- a Q value operation unit that determines (a) a real part and an imaginary part of impedance of a resonance circuit using a self-balancing bridge circuit and a vector ratio detector, and (b) calculates the primary side Q value of the primary side coil from a ratio thereof; and
- a determination unit that determines the state of electromagnetic coupling of the primary side coil with the secondary side coil by comparing the primary side Q value of the primary side coil determined by the Q value operation unit with a threshold set based on the primary side Q value measured in advance when no conductor is present near the primary side coil.

13. The power transmission apparatus according to claim 1, wherein the abnormal value is outside of a range of a second threshold and the normal value is inside of the range of the second threshold.

14. The power transmission apparatus according to claim 1, wherein the detection unit is configured to sweep a frequency of a sine wave to measure the Q value of the primary side coil.

15. The power transmission apparatus according to claim 1, wherein the detection unit uses a threshold Q value to detect presence of conductive foreign matter between the primary side coil and the secondary side coil, the threshold Q value being measured in advance when no conductive foreign matter is present near the primary side coil.

16. A contactless power transmission system comprising:
- a power transmission apparatus including a primary side coil and a detection unit; and
- a power receiving apparatus including a secondary side coil electromagnetically coupled with the primary side coil, wherein,
- the detection unit measures a primary side Q value and determines whether the measured primary side Q value is an abnormal value outside of a predetermined range or a normal value within a predetermined range,
- the detection unit terminates operation of the power transmission apparatus when the measured primary side Q value is the abnormal value,
- the detection unit starts transmission of power from the power transmission apparatus to the power receiving apparatus when the measured primary side Q value is the normal value; and
- the detection unit is configured to resolve whether foreign matter is present between the primary side coil and the secondary coil using the measured Q value of the primary side coil and the measured power transmission efficiency value.

17. A power transmission apparatus comprising:
a primary side coil to be electromagnetically coupled with a secondary side coil; and
a detection unit configured to measure a Q value of the primary side coil and determine whether the measured Q value of the primary side coil is a normal value within a predetermined range, or an abnormal value outside of the predetermined range, wherein,
- the detection unit is configured to terminate transmission of power from the power transmission apparatus when the measured Q value of the primary side coil is the abnormal value,
- the detection unit is configured to start transmission of power from the power transmission apparatus to a power receiving apparatus and to measure a power transmission efficiency of the transmission of power to the secondary coil when the measured Q value of the primary side coil is the normal value, and
- the detection unit is configured to detect foreign matter between the primary side coil and the secondary coil using the measured Q value of the primary side coil and the measured power transmission efficiency value by (a) calculating a calculated value based on the measured power transmission efficiency and the measured Q value of the primary side coil in response to the start of transmission of power from the power transmission apparatus to the power receiving apparatus and measurement of the power transmission efficiency of the transmission of power to the secondary coil, (b) comparing the calculated value with a threshold value stored in a memory, and (c) determining that the metal foreign matter is present between the power transmission apparatus and the power receiving apparatus when the calculated value is less than the threshold.

* * * * *